US007512118B1

(12) United States Patent
Stephens

(10) Patent No.: US 7,512,118 B1
(45) Date of Patent: Mar. 31, 2009

(54) CODEC NEGOTIATION CONSIDERING QUALITY AND COSTS

(75) Inventor: Gary Stephens, Richardson, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 811 days.

(21) Appl. No.: 11/171,921

(22) Filed: Jun. 30, 2005

(51) Int. Cl.
*H04L 12/28* (2006.01)
*H04J 1/16* (2006.01)

(52) U.S. Cl. ............... 370/352; 370/401; 379/88.17

(58) Field of Classification Search ......... 370/352–356, 370/400, 401, 252; 379/88.17
See application file for complete search history.

(56) References Cited

U.S. PATENT DOCUMENTS 6,775,267 B1 * 8/2004 Kung et al. ................. 370/352

OTHER PUBLICATIONS

Rosenberg, J., et al; RFC 3261: SIP: Session Initiation Protocol; The Internet Society (Jun. 2002).
Rosenberg, J., et al; RFC 3262: Reliability of Provisional Responses in the Session Initiation Protocol; The Internet Society (Jun. 2002).
Rosenberg, J.; RFC 3311: The Session Initiation Protocol (SIP) Update Method; The Internet Society (Sep. 2002).
Olson, S.; RFC 3266: Support for IPv6 in Session Description Protocol (SDP); The Internet Society (Jun. 2002).
Rosenberg, J., et al; RFC 3264: An Offer/Answer Model with the Session Description Protocol (SDP); The Internet Society (Jun. 2002).
Handley, M.; RFC 2327: SDP: Session Description Protocol; The Internet Society (Apr. 1998).
Schulzrinne, Henning; The Session Initiation Protocol (SIP); Columbia University (May 2001).
Leibovitch, Hans et al. (ed); Implementation Agreement for SDP Usage & Codec Negotiation for GMI 2004; Multiservice Switching Forum (2004).
Roach, A. B.; RFC 2543: Session Initiation Protocol (SIP) Specific Event Notification; The Internet Society (Jun. 2002).
An Overview of H.323—SIP Interworking, Radvision (2001).
SIP Server Technical Overview, Radvision (Apr. 2004).
Janak, Jan, SIP Introduction; FhG Fokus (2003).
Overview of the Session Initiation Protocol; Cisco Systems (Sep. 2002).

* cited by examiner

*Primary Examiner*—John Pezzlo
(74) *Attorney, Agent, or Firm*—Hemingway & Hansen, LLP; D. Scott Hemingway

(57) ABSTRACT

A message protocol on a communication network between an originating and terminating communication device transmits the cost and quality of service impact of selecting a CODEC standard where no single CODEC is supported in the end-to-end packet transmission. Each call agent server on the communication generates and submits a session initiation protocol (SIP) message containing a data element for the additional cost and a data element for the additional total quality of service degradation, calculating the additions considering all prior calculated data elements. The data elements are part of the session description protocol message. Either the final server prior to the terminating communication device or the terminating communication device operates an algorithm to make an optimal selection and avoid unnecessary high cost or degraded quality of service. The selected CODEC standard is communicated back to the servers in an SIP response message.

20 Claims, 2 Drawing Sheets

CODEC NEGOTIATION CONSIDERING QUALITY AND COSTS

TECHNICAL FIELD OF THE INVENTION

A message protocol for selecting the CODEC standard using the session initiation protocol (SIP) protocol.

BACKGROUND OF THE INVENTION

The Internet, like so many other high tech developments, grew from research originally performed by the United States Department of Defense. In the 1960s, the military had accumulated a large collection of incompatible computer networks. Computers on these different networks could not communicate with other computers across their network boundaries.

In the 1960s, the Defense Department wanted to develop a communication system that would permit communication between these different computer networks. Recognizing that a single, centralized communication system would be vulnerable to attacks or sabotage, the Defense Department required that the communication system be decentralized with no critical services concentrated in vulnerable failure points. In order to achieve this goal, the Defense Department established a decentralized standard communication protocol for communication between their computer networks.

A few years later, the National Science Foundation (NSF) wanted to facilitate communication between incompatible network computers at various research institutions across the country. The NSF adopted the Defense Department's protocol for communication, and this combination of research computer networks would eventually evolve into the Internet.

Internet Protocols

The Defense Department's communication protocol governing data transmission between different networks was called the Internet Protocol (IP) standard. The IP standard has been widely adopted for the transmission of discrete information packets across network boundaries. In fact, the IP standard is the standard protocol governing communications between computers and networks on the Internet.

The IP standard identifies the types of services to be provided to users and specifies the mechanisms needed to support these services. The IP standard also specifies the upper and lower system interfaces, defines the services to be provided on these interfaces, and outlines the execution environment for services needed in the system.

A transmission protocol, called the Transmission Control Protocol (TCP), was developed to provide connection-oriented, end-to-end data transmission between packet-switched computer networks. The combination of TCP with IP (TCP/IP) forms a suite of protocols for information packet transmissions between computers on the Internet. The TCP/IP standard has also become a standard protocol for use in all packet switching networks that provide connectivity across network boundaries.

In a typical Internet-based communication scenario, data is transmitted from an originating communication device on a first network across a transmission medium to a destination communication device on a second network. After receipt at the second network, the packet is routed through the network to a destination communication device, and the TCP/IP protocol determines this routing. Because of the standard protocols in Internet communications, the IP protocol on the destination communication device decodes the transmitted information into the original information transmitted by the originating device.

TCP/IP Addressing and Routing

Under the TCP/IP protocols, a computer operating on an IP-based network is assigned a unique physical address called an IP address. The IP address can include: (1) a network ID and number identifying a network, (2) a sub-network ID number identifying a substructure on the network, and (3) a host ID number identifying a particular computer on the sub-network. A header data field in the information packet will include source and destination addresses. The IP addressing scheme imposes a consistent addressing scheme that reflects the internal organization of the network or sub-network.

A router is used to regulate the transmission of information packets into and out of the computer network. Routers interpret the logical address contained in information packet headers and direct the information packets to the intended destination. Information packets addressed between computers on the same network do not pass through a router on the boundary of the network, and as such, these information packets will not clutter the transmission lines outside the network. If data is addressed to a computer outside the network, the router on the network boundary forwards the data onto the greater network.

TCP/IP network protocols define how routers determine the trans-mission path through a network and across network boundaries. Routing decisions are based upon information in the IP header and corresponding entries in a routing table maintained on the router. A routing table contains the information for a router to determine whether to accept an information packet on behalf of a device or pass the information packet onto another router.

The IP-Based Mobility System

The Internet protocols were originally developed with an assumption that Internet users would be connected to a single, fixed network. With the advent of cellular wireless communication systems using mobile communication devices, the movement of Internet users within a network and across network boundaries has become common. Because of this highly mobile Internet usage, the implicit design assumption of the Internet protocols (e.g. a fixed user location) is violated by the mobility of the user.

In an IP-based mobile communication system, the mobile communication device (e.g. cellular phone, pager, computer, etc.) can be called a mobile node or mobile station. Typically, a mobile station maintains connectivity to its home network while operating on a visited network. The mobile station will always be associated with its home network for IP addressing purposes and will have information routed to it by routers located on the home and visited networks. The routers can be referred to by a number of names including Home Agent, Home Mobility Manager, Home Location Register, Foreign Agent, Serving Mobility Manager, Visited Location Register, and Visiting Serving Entity.

IP computer networks also include one or more computer servers. These server computers provide services to other computers and support the transfer and communication of data over the network. One common service is authentication, authorization, and accounting activity (AAA), and AAA servers on the home and foreign network perform the AAA activities for each network. Other common servers are Web servers, mail servers, and Local Area Network (LAN) servers.

Session Initiation Protocol (SIP)

The $3^{rd}$ Generation Partnership Project (3GPP) and $3^{rd}$ Generation Partnership Project 2 (3GPP2) are evolving third generation communication system standards for wireless communication systems transmitting multimedia services.

These 3GPP and 3GPP2 mobile communication systems support multimedia telecommunication services delivering voice Internet Protocol (VoIP) and data, to include pictures, video communications, and other multimedia information over mobile wireless connections. These systems generally operate over a derivative Code Division Multiple Access (CDMA), General Packet Radio Service (GPRS) and/or Universal Mobile Telecommunication Systems (UMTS) communication system architecture.

The Session Initiation Protocol (SIP) was developed to setup communication paths over the system's routers and server computers for transmitting information packets containing multimedia communications over 3GPP2 systems. SIP is a signaling protocol used to initiate, manage, and terminate multimedia communications over packet networks. SIP has evolved to become the core protocol for establishing multimedia communication sessions over the Internet. The protocol transmits information packets establishing, changing, and terminating communication sessions for multimedia applications in IP-based networks. SIP is used to determine user location, user availability, use capabilities, session setup, and session management. SIP registers IP-based address end points; performs address resolution, name mapping and call redirection functions; determines media capabilities of the target end points; registers end user preferences and call routing; registers and publishes presence information; establishes a communication session and support mid-session changes; and supports transfer and termination of calls.

There are two basic types of SIP messages—Requests and Responses. Requests are sent from a client to a server, and Responses are sent from a server to a client. Requests message types include INVITE, ACK, BYE, CANCEL, OPTIONS, REGISTER, and INFO. INVITE messages are used to initiate a call. ACK confirms a final response to an INVITE. BYE terminates a call. CANCEL terminates searches and ringing. OPTIONS requests the capabilities the other side. Response types include Provisional and Final. Examples of Response type messages include 100 Trying, 180 Ringing, 200 OK, 401 Unauthorized, 403 Forbidden, 408 Request time-out, 600 Busy, and 603 Decline.

Each SIP message is composed of three parts 1) a Start Line, 2) a Header field, and 3) a Body. The Start Line designates the message type and the protocol version. Headers are used to convey message attributes and modify message meanings. The Body describes the message being initiated such as a multimedia session that may include audio and video CODEC types. It may also be used to convey opaque textual or binary data that relates to the session. The message body can include Session Description Protocol (SDP) and Multipurpose Internet Mail Extensions (MIME).

The Session Initiation Protocol (SIP) handles initiation of interactive communications sessions between users and termination and modifications of sessions. "Initiating" requires determining where the user being contacted can be contacted at a particular moment. This might be on a PC at work, a mobile cell phone, a PC at home, or an IP desk phone at work or home.

Once the user being called is located, SIP performs its second main function of delivering a description of the invited session. SIP transports information about the protocol used to describe the session. Session Description Protocol (SDP) is used by SIP to describe the session. The SIP/SDP format can also be used to negotiate a common communication format (e.g. the CODEC) for the session. Once the session description has been delivered, SIP is used to transmit the response (accept, reject, etc.). If accepted, the session is now active. SIP can also be used to modify the session or terminate the session (i.e., hang up).

Session Description Protocol (SDP)

The SDP protocol describes multimedia session announcement, multimedia session invitation, and other forms of multimedia session initiation. SDP packets typically include session information (e.g. 1) name and purpose, 2) time session is active, and 3) contact information for user responsible for the session) and media information (e.g. type of media, transport protocol, media format, multicast address and Transport Port for media, and remote address for media and Transport Port for contact address).

SIP is based on an offer-answer paradigm. To initiate a session, the caller (known as the User Agent Client or UAC) sends a request (called an INVITE) to the person the caller wants to talk to. This message is sent through one or more call agent servers that route and deliver messages to the called party. The called party sends a response, accepting or rejecting the invitation, which is forwarded back through the same set of servers in reverse order.

SDP is used within SIP messages to make the "offer-answer" exchange to set up the bearer pathway for the session. The SIP message flow contains SDP packets to select the compatible compression/decompression standards for a session. CODEC is the compression/decompression standard algorithm used to compress and decompress the transmitted data file so that the text, program, images, audio, or video can be transmitted over the Internet without excessive and prohibitive use of bandwidth and network resources. For example, a 15-megabyte video file might be reduced to 150 kilobytes using a CODEC. There are a number of different CODECs available, and each CODEC standard has compatibility issues compared with other CODECs. The SIP/SDP message protocol is used to negotiate and setup the bearer pathway and select a common CODEC for transmissions between the originating device and the terminating device (e.g. the endpoints) of the session or a CODEC standard that is compatible over particular portions of the bearer path. In some cases involving multiple transited call servers between the originating and the terminating device, there may not be a common CODEC standard available, which requires hops along the pathway to either select a common CODEC for the next hop or perform a transcoding operation to trans-late the data to a new CODEC for the next hop.

Under current protocol applications, when selecting the CODEC for each hop in a session, the overall cost for any one selected CODEC or quality of service is not considered. This becomes problematic where multiple hops occur, because local policy at each level may result in a CODEC selection at an undesirable quality of service or cost level. It would be advisable when selecting the CODEC for a session to consider the total call quality of service and the total cost that will result from a chosen option. However, under the current SIP/SDP protocol, the only information available is the CODECs being offered on a single hop. There is no information about whether or not there have been any previous hops or what those hops might have in terms of cost or quality characteristics.

For example, in a CDMA call, it may be necessary to transcode the voice call multiple times in order to provide a particular CODEC. If the remote end chooses the CODEC without having this information, the remote end could unintentionally degrade the voice quality to an unacceptable level or it could incur extra cost where such cost is not necessary.

There is a need for a mechanism in place so that call quality and costs considerations result in optimal CODEC selection.

SUMMARY OF THE INVENTION

The first call agent server or the original communication device in the call flow offers the CODEC list according to the prior art protocol that is communicated toward the terminating call agent server or terminating communication device. This is accomplished using a SIP message with the SDP protocol. The second call agent server in the call flow, when offering a CODEC list in a second hop, offers its CODEC list but in addition includes two new data elements for each of its listed CODECs that indicate any additional quality degradation or cost beyond normal in the message. For example, if CODEC X requires a transcode to be performed that adds a bandwidth cost and/or degrades quality beyond what is normally expected for CODEC X, information would be included to indicate the additional quality degradation and/or additional cost. This continues until the last hop.

The final call agent server or the terminating communication device receives the final list of CODECs (sent by the previous server) and the quality and cost information for all of the hops prior to the last one (the CODEC list itself implies the quality and cost information for the last hop). Based on policy information, the final CODEC is chosen according to a local algorithm considering the total quality of the end-to-end connection and the total cost implications for a particular CODEC. This selection is then transmitted using a 180 Ringing or 200 OK Response, or other message containing an answer SDP (e.g. 180 Ringing, 183 Progress, 200 OK ACK, PRACK, or perhaps others).

BRIEF DESCRIPTION OF THE DRAWINGS

The objects and features of the invention will become more readily understood from the following detailed description and appended claims when read in conjunction with the accompanying drawings in which like numerals represent like elements and in which:

DETAILED DESCRIPTION OF THE PREFERRED EMBODIMENTS

Figure 1:
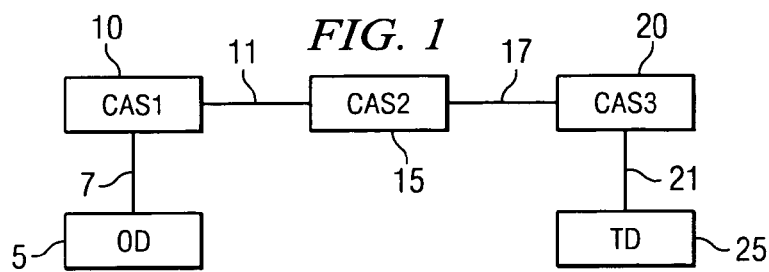
FIG. 1 is a diagram of a simple communication system using SIP/SDP for a communication session initiation.

FIG. 1 shows the basic configuration of a communication system using the SIP protocol. Originating Device (OD) 5 is coupled to Call Agent Server1 (CAS1) 10 by communication link 7. The OD 5 can be either a mobile communication device (e.g. laptop computer, Blackberry, cell phone, etc) or wired communication device (e.g. IP phone, desktop computer, etc.). The communication link 7 can also be a wired communication connection, include a wireless communication connection, or traverse the Internet.

The CAS1 10 is coupled to CAS2 15 by communication link 11. CAS2 15 is coupled to CAS3 20 by communication link 17, and CAS3 20 is coupled to Terminating Communication Device (TD) 25 by communication link 21. Communication links 11 and 17 can be a wired or wireless connection and may traverse the Internet. Communication link 21 can also be a wired or wireless communication link, but typically would not traverse the Internet although traversing the Internet is a possible configuration. The CAS1 10, CAS2 15, and CAS3 20 are all computer servers supporting communication over the system including SIP functions to setup and facilitate multimedia communication between communication devices, such as OD 5 and TD 25, connected to the network.

To initiate and support a communication session over the system, SIP messages are generated and transmitted. The SIP messages include a Session Description Protocol (SDP) message. SIP uses SDP for media descriptions to describe the audio, video, and multimedia used in the sessions. SIP is a control protocol used for creating, modifying, and terminating sessions with one or more participants. Applications include Internet multimedia conferences, Internet (or any IP Network) telephone calls and multimedia distribution. The communication session can use multicast or a mesh of unicast relations, or a combination.

An SDP consists of a number of lines of text in the following format:

<type>=<value>

<type> is always exactly one character and is case-significant. <value> is a structured text string whose format depends on the <type>. Generally, <value> is composed of either a number of fields delimited by a single space character or a free format string.

A SDP provides a session-level description (details that apply to the whole session and all media streams) and optionally several media-level descriptions (details that apply only to a single media stream). The session-level portion SDP begins with a 'v=' line and continues to the first media-level section. The media-level description begins with an 'm=' line and continues to the next media description or to the end of the whole SDP description.

The following individual fields have the following meanings under the SDP protocol, and they must be arranged in this order:

v=Protocol Version
o=The Owner/Creator and Session Identifier
s=Session Name
i=*Session Information
u=*URI of description
e=*Email Address
p=*Phone Number
c=*Connection Information
b=*Bandwidth Information One or More Time Descriptions z=*Time Zone Adjustments
k=*Encryption Key
a=*zero or more Session Attributes Zero or More Media Descriptions Each of the time description includes a "t=" field, optionally followed by one or more "r=" fields.

t=Time the Session is Active
r=*zero or more Repeat Times

Each media description includes a "m" field, followed by with other optional fields providing additional information:

m=Media Name and Transport Address
i=*Media Title
c=*Connection Information
b=*Bandwidth Information k=*Encryption Key
a=*zero or more Media Attributes
* indicates an optional entry.

In the invention, two new individual fields are added that designate the cost and quality of service impact that selecting a CODEC imposes on a communication session during the setup and initiation along each hop. The invention is a method to optimize quality of service and costs for the communication and is applicable when 1) no single CODEC standard is supported by the end-to-end communication link, and 2) more than one entity has the potential to do transcoding. By costs, the invention is primarily concerned with bandwidth requirements for the CODEC standard chosen and the Central Processing Unit (CPU) requirements for transcoding, but other considerations are possible. By quality of service, the invention is primarily concerned with delay and sound accuracy loss, but other considerations are possible.

Figure 2:
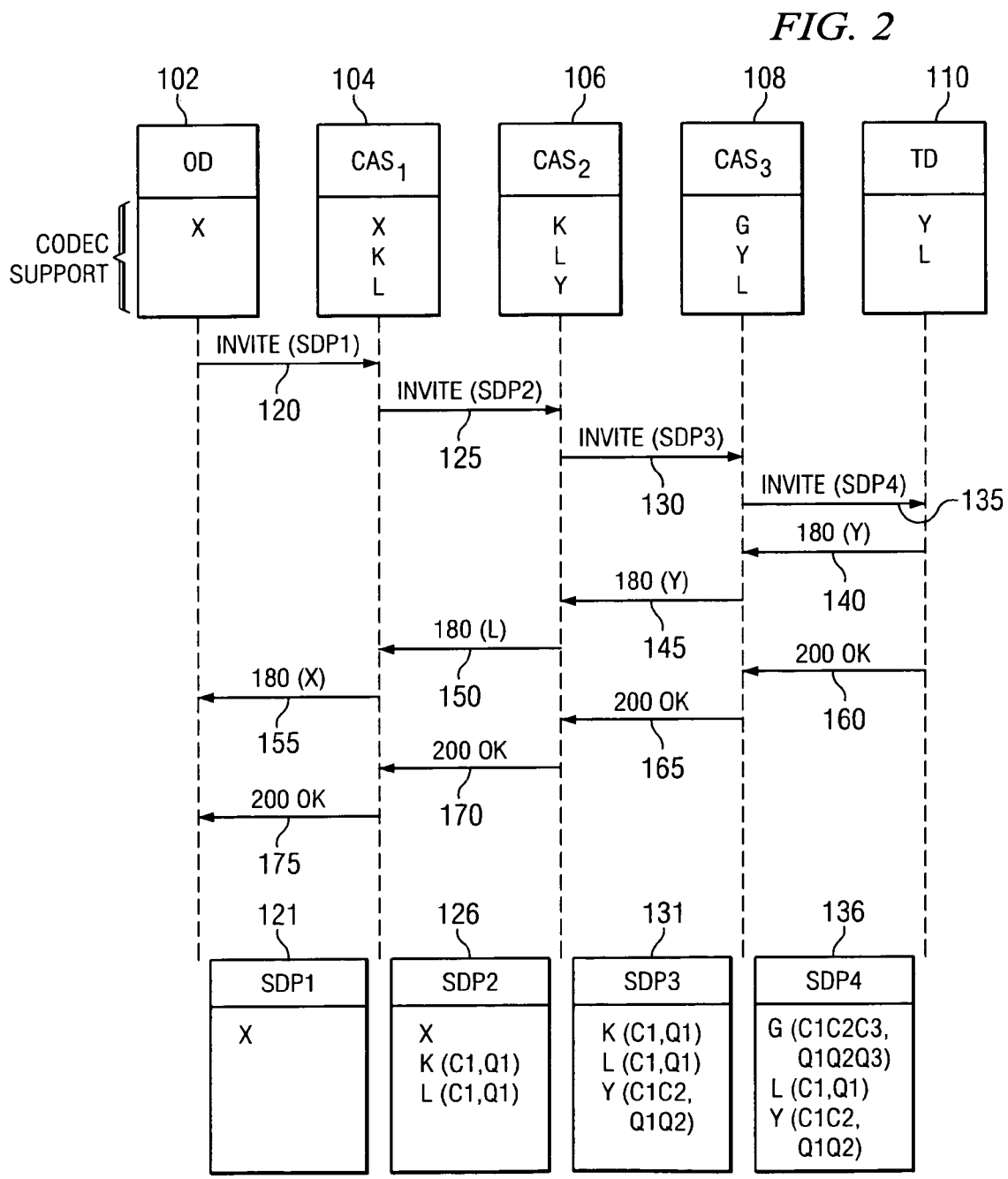
FIG. 2 is a call flow for the SIP and SDP data using the invention where the CODEC selection is transmitted using the 180 Ringing SIP message.

FIG. 2 shows the message flow for the invention where the 180 Ringing SIP message is used to communicate the selected CODEC. In this embodiment, the OD 102 supports CODEC standard X. The CAS1 104 supports CODEC standards X, K, and L. The CAS2 106 supports CODEC standards K, L, and Y. The CAS3 108 supports CODEC standards G, Y, and L. The TD 110 supports CODEC standards Y and L.

To setup the communication session, a SIP INVITE message is transmitted from the OD 102 to the CAS1 104 at step 120. The INVITE message contains SDP1 121 message conveying information for the supported CODEC X standard. This message signifies that the supported CODEC on the OD 102 is CODEC X and that the data format for the communication originating from OD 102 will be according to CODEC X. CAS1 104 supports three CODEC standards—X, K, and Y. At step 122, CAS1 104 transmits an INVITE to CAS2 106 that contains SDP2 126. SDP2 126 includes the two new data elements of the invention for each of the supported CODECs. For X, there may be data elements C1 and Q1 assigned according to local policy for the CAS1 104 that reflects the additional cost or quality of service associated with selecting that CODEC standard. However, if there is no additional cost or quality degradation identified beyond normal for CODEC X then no C1 and Q1 may be assigned. For K, there are data elements C1 and Q1 assigned according to local policy for the CAS1 104 that reflects the cost and quality of service associated with selecting that CODEC standard including any quality degradation and cost of transcoding CODEC X (the only CODEC supported on the first hop) to CODEC K or L. For L, there are data elements C1 and Q1 assigned according to local policy for the CAS1 104 that reflects the cost and quality of service associated with selecting that CODEC standard including any quality degradation and cost of transcoding CODEC X (the only CODEC supported on the first hop) to CODEC K or L. While C and Q are used for purposes of showing the preferred embodiment, any letter of the alphabet not yet adopted within SPD can be adopted as the standard.

In step 130, CAS2 106 receives the INVITE message from CAS1 104 and generates and transmits an INVITE message containing SDP3 131 to CAS3 108. CAS2 106 supports CODEC standards K, L, and Y. SDP3 131 contains data elements reflecting the costs and quality of adopting each of the standards. CODEC K still has data elements C1 and Q1 assigned according to local policy for the CAS1 104, because there should be no additional cost or quality of service degradation associated with selecting that CODEC standard by the CAS2 106. However, if unexpected costs or degradation of quality of service are encountered, then data elements for those costs and degradation can be included for CODEC K and calculated by the algorithm operating on CAS2 106.

CODEC L also has a data element C1 and Q1 assigned according to local policy for the CAS1 104 that reflects the cost and quality of service associated with selecting that CODEC standard on CAS1 104. However, because no additional costs or degradation of quality of service should be associated with using that CODEC there are no data elements for CAS2 106 assigned, processed, or calculated by the algorithm operating on CAS2 106. If such additional costs or quality of service impacts exists, the algorithm operating on CAS2 106 will calculate the totals and generate and transmit an INVITE with the appropriate values in SDP3 131.

CODEC Y has a data element C2 and Q2 assigned according to local policy for the CAS2 106 that reflects the cost and quality of service associated with selecting that CODEC standard. However, CAS2 106 must also consider the additional cost and/or quality of service degradation associated with CAS1 104 and has data elements C1 and Q1 that must be included. CAS2 106 processes the data elements C2 and C1 according to an algorithm to generate data element C1C2, which indicates the total cost of adopting CODEC Y between CAS1 104 and CAS2 106. Similarly, CAS2 106 processes the data elements Q2 and Q1 (the degradation at CAS1 104) according to an algorithm to generate data element Q1Q2, which indicates the total quality of service impact of adopting CODEC Y between CAS1 104 and CAS2 106.

In step 135, CAS3 108 receives the INVITE message from CAS2 106 and generates and transmits an INVITE message containing SDP4 136 to the TD 110. CAS3 108 supports CODEC standards G, L, and Y. SDP4 136 contains data elements reflecting the costs and quality of service degradation associated with adopting each of the standards. CODEC G has data elements C3 and Q3 assigned according to local policy for the CAS3 108 that reflects the cost and quality of service associated with selecting that CODEC standard including any quality degradation and cost of transcoding CODEC L or Y to CODEC G. However, CAS3 108 must also consider the additional cost and/or quality of service degradation associated with CAS1 104 and CAS2 106 and has data elements C1C2 and Q1Q2 for those two servers. CAS3 108 processes the data elements C3, C2 and C1 according to an algorithm to generate data element C1C2C3, which indicates the total cost of adopting CODEC Y between CAS1 104 and CAS3 108. Similarly, CAS3 108 processes the data elements Q3, Q2, and Q1 according to an algorithm to generate data element Q1Q2Q3, which indicates the total quality of service degradation.

CODEC L has a data element C1 and Q1 assigned according to local policy for the CAS1 104 that reflects the cost and quality of service associated with selecting that CODEC standard, because no additional costs or quality of service should be associated with that CODEC between CAS1 104 and CAS3 108 since CODEC L is supported by each server. However, any unexpected additional costs can be included and calculated accordingly.

CODEC Y has data elements C1C2 and Q1Q2 generated and assigned by CAS2 106. Because CAS3 108 supports CODEC Y, there should be no additional cost or degradation associated with using CODEC Y. However, any unexpected additional costs and/or quality of service degradation can be included and calculated accordingly.

The TD 110 receives the INVITE message and generates a 180 Ringing message at step 140. The TD 110 supports CODEC Y and L. A logic operation selects CODEC Y using the parameters contained in SDP4 to consider the total quality degradation of the end-to-end connection and the total cost implications of the chosen CODEC. In this example, the best choice is CODEC Y. TD 110 generates and transmits a 180

Ringing message in response that includes a data element in the SDP indicating the chosen CODEC Y and transmitted to CAS3 108 in step 140 that indicates that the communication initiation successfully reached the TD 110.

In step 145, CAS3 108 receives the 180 Ringing message, processes the message with the data element indicating the choice of CODEC Y in a SDP, and selects that standard to use. Alternatively, the CAS3 108 can perform the logic operation to select the optimal CODEC. Whether the logic operation is performed by the TD 110 or the CAS3 108, the CAS3 108 transmits a 180 Ringing message to CAS2 106 with a data element indicating the optimal choice in the SDP. The CAS2 106 receives the 180 Ringing message and processes the message with the data element indicating the choice of CODEC Y in a SDP for communication with CAS3 108. CAS2 106 however is aware that CAS1 104 does not support CODEC Y, and selects L based on the earlier generated SDP2 as the optimal CODEC to use, which will require transcoding CODEC L to CODEC Y. CAS2 106 then transmits a 180 Ringing message to CAS1 104 in step 150.

In step 150, CAS1 104 receives the 180 Ringing message, processes the message with the data element in a SDP indicating the choice of CODEC L, and selects that standard to use for communication to CAS2 106. CAS1 104 is aware that OD 102 only supports CODEC X, so CODEC X is used for communication with OD 102, and CAS1 104 transcodes X to L for communication with CAS2 106. The 180 Ringing message in step 155 includes the data element indicating use of CODEC X in a SDP, because alternatively, OD 102 may support more than one CODEC standard.

In step 160, the communication is accepted by the TD 110, and a 200 OK message indicating the communication is established, generated, and transmitted to CAS3 108. CAS3 108 receives the 200 OK message, processes the message and transmits a 200 OK message to CAS2 106 in step 165. In step 170, CAS2 106 receives the 200 OK message, processes the message and transmits a 200 OK message to CAS1 104. In step 175, CAS1 104 receives the 200 OK message, processes the message and transmits a 200 OK message to OD 102, completing initiation of the communication session.

Figure 3:
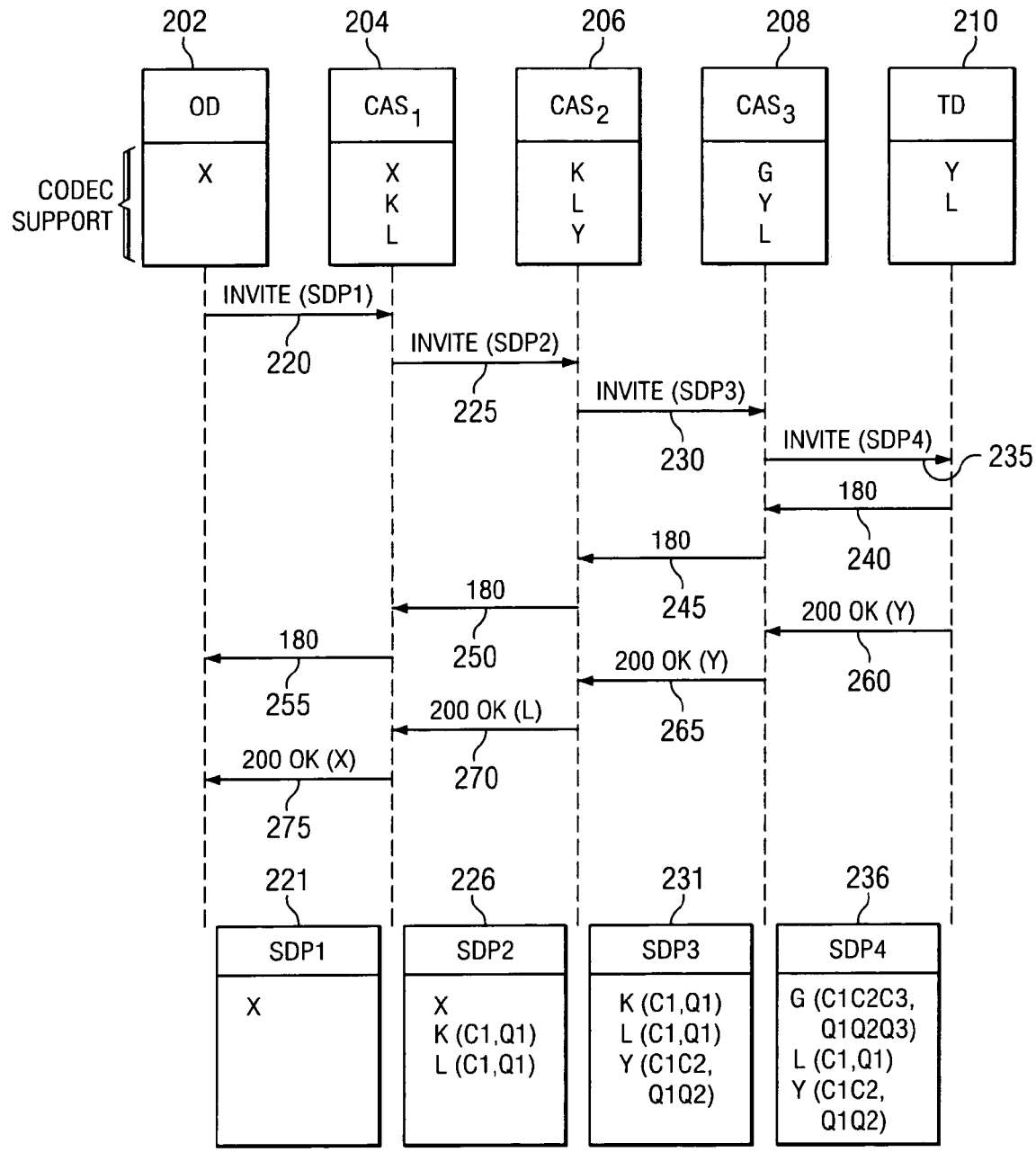
FIG. 3 is a call flow for the SIP and SDP data using the invention where the CODEC selection is transmitted using the 200 OK message.

FIG. 3 shows the message flow for the invention where the 200 OK SIP message is used to communicate the selected CODEC. In this embodiment, the OD 202 supports CODEC standard X. The CAS1 204 supports CODEC standard X, K, and L. The CAS2 206 supports CODEC standard K, L, and Y. The CAS3 208 supports CODEC standard G, Y, and L. The TD 210 supports CODEC standard Y and L.

To setup the communication session, a SIP INVITE message is transmitted from the OD 202 to the CAS1 204 at step 220. The INVITE message contains SDP1 221 message conveying information for the supported CODEC X standard. This message signifies that the supported CODEC on the OD 202 is CODEC X and that the data format for the communication originating from OD 202 will be according to CODEC X. CAS1 204 supports three CODEC standards—X, K, and Y. At step 222, CAS1 204 transmits an INVITE to CAS2 206 that contains SDP2 226. SDP2 226 includes the two new data elements of the invention for each of the supported CODECs. For X, there may be data elements C1 and Q1 assigned according to local policy for the CAS1 204 that reflects the additional cost or quality of service associated with selecting that CODEC standard. However, if there is no additional cost or quality degradation identified beyond normal for CODEC X then no C1 and Q1 may be assigned. For K, there are data elements C1 and Q1 assigned according to local policy for the CAS1 204 that reflects the cost and quality of service associated with selecting that CODEC standard including any quality degradation and cost of transcoding CODEC X (the only CODEC supported on the first hop) to CODEC K or L. For L, there are data elements C1 and Q1 assigned according to local policy for the CAS1 204 that reflects the cost and quality of service associated with selecting that CODEC standard including any quality degradation and cost of transcoding CODEC X (the only CODEC supported on the first hop) to CODEC K or L. While C and Q are used for purposes of showing the preferred embodiment, any letter of the alphabet not yet adopted within SPD can be adopted as the standard.

In step 230, CAS2 206 receives the INVITE message from CAS1 204 and generates and transmits an INVITE message containing SDP3 231 to CAS3 208. CAS2 206 supports CODEC standards K, L, and Y. SDP3 231 contains data elements reflecting the costs and quality of adopting each of the standards. CODEC K still has data elements C1 and Q1 assigned according to local policy for the CAS1 204, because there should be no additional cost or quality of service degradation associated with selecting that CODEC standard by the CAS2 206. However, if unexpected costs or degradation of quality of service are encountered, then data elements for those costs and degradation can be included for CODEC K and calculated by the algorithm operating on CAS2 206.

CODEC L also has a data element C1 and Q1 assigned according to local policy for the CAS1 204 that reflects the cost and quality of service associated with selecting that CODEC standard on CAS1 204. However, because no additional costs or degradation of quality of service should be associated with using that CODEC there are no data elements for CAS2 206 assigned, processed, or calculated by the algorithm operating on CAS2 206. If such additional costs or quality of service impacts exists, the algorithm operating on CAS2 206 will calculate the totals and generate and transmit an INVITE with the appropriate values in SDP3 231.

CODEC Y has a data element C2 and Q2 assigned according to local policy for the CAS2 206 that reflects the cost and quality of service associated with selecting that CODEC standard. However, CAS2 206 must also consider the additional cost and/or quality of service degradation associated with CAS1 204 and has data elements C1 and Q1 that must be included. CAS2 206 processes the data elements C2 and C1 according to an algorithm to generate data element C1C2, which indicates the total cost of adopting CODEC Y between CAS1 204 and CAS2 206. Similarly, CAS2 206 processes the data elements Q2 and Q1 (the degradation at CAS1 204) according to an algorithm to generate data element Q1Q2, which indicates the total quality of service degradation of adopting CODEC Y between CAS1 204 and CAS2 206.

In step 135, CAS3 208 receives the INVITE message from CAS2 206 and generates and transmits an INVITE message containing SDP4 236 to the TD 210. CAS3 208 supports CODEC standards G, L, and Y. SDP4 236 contains data elements reflecting the costs and quality of service degradation associated with adopting each of the standards. CODEC G has data elements C3 and Q3 assigned according to local policy for the CAS3 208 that reflects the cost and quality of service associated with selecting that CODEC standard including any quality degradation and cost of transcoding CODEC L or Y to CODEC G. However, CAS3 208 must also consider the additional cost and/or quality of service degradation associated with CAS1 204 and CAS2 206 and has data elements C1C2 and Q1Q2 for those two servers. CAS3 208 processes the data elements C3, C2 and C1 according to an algorithm to generate data element C1C2C3, which indicates the total cost of adopting CODEC Y between CAS1 204 and CAS3 208. Similarly, CAS3 208 processes the data elements Q3, Q2, and Q1 according to an algorithm to generate data element Q1Q2Q3, which indicates the total quality of service degradation.

CODEC L has a data element C1 and Q1 assigned according to local policy for the CAS1 204 that reflects the cost and quality of service associated with selecting that CODEC standard, because no additional costs or quality of service should be associated with that CODEC between CAS1 204 and CAS3 208 since CODEC L is supported by each server. However, any unexpected additional costs can be included and calculated accordingly.

CODEC Y has data elements C1C2 and Q1Q2 generated and assigned by CAS2 206. Because CAS3 208 supports CODEC Y, there should be no additional cost or degradation associated with using CODEC Y. However, any unexpected additional costs and/or quality of service degradation can be included and calculated accordingly.

The TD 210 receives the INVITE message and generates a 180 Ringing message at step 240. The TD 210 supports CODEC Y and L. A logic operation selects CODEC Y using the parameters contained in SDP4 to consider the total quality of the end-to-end connection and the total cost implications of the chosen CODEC. In this example, the best choice is CODEC Y. TD 210 generates and transmits a 180 Ringing message to CAS3 208 in step 240 that indicates that the communication initiation successfully reached the TD 210 where the 180 Ringing message is processed. A 180 Ringing message indicating the communication has reached the TD 210 is then generated and transmitted by CAS3 208 to CAS2 206 in step 245. In step 240, CAS2 206 receives the 180 Ringing message, processes the message, and transmits a 180 Ringing message to CAS1 204 in step 250. In step 255, CAS1 204 processes the message and transmits a 180 Ringing message to OD 202.

In step 260, the communication is accepted at the TD 210, and a 200 OK message indicating the communication is established is generated and transmitted. In this embodiment, the data element indicating the selection of CODEC Y is included in the 200 OK message. In step 260, CAS3 208 receives the 200 OK message, processes the message with the data element indicating the choice of CODEC Y, and selects that standard to use. Alternatively, the CAS3 208 can perform the logic operation to select the optimal CODEC. Whether the logic operation is performed by the TD 210 or the CAS3 208, the CAS3 208 transmits a 200 OK message to CAS2 206 with a data element indicating the optimal choice. In step 265, the CAS2 206 receives the 200 OK message and processes the message with the data element indicating the choice of CODEC Y for communication with CAS3 208. CAS2 206 however is aware that CAS1 204 does not support CODEC Y, and selects L based on the earlier generated SDP2 as the optimal CODEC to use, which will require transcoding of CODEC L to CODEC Y. CAS2 206 then transmits a 200 OK message to CAS1 204 in step 270.

In step 270, CAS1 204 receives the 200 OK message, processes the message with the data element indicating the choice of CODEC L, and selects that standard to use for communication to CAS2 206. CAS1 204 is aware that OD 202 only supports CODEC X, so CODEC X is used for communication with OD 102, and CAS1 204 transcodes X to L for communication with CAS2 206. The 200 OK message in step 275 includes the data element indicating use of CODEC X, because alternatively, OD 202 may support more than one CODEC standard, which requires an optimal selection. This completes initiation and setup of the communication session.

While the preferred embodiment has been described, other embodiments are possible. Rather than a SIP Invite message, the offer to use a CODEC and the associated C and Q data elements can be in a 180, 181, 182, 183, ACK, or PRACK messages. Also, although SIP is the preferred message protocol to use for the offer of a CODEC, another protocol may be used.

While the invention has been particularly shown and described with respect to preferred embodiments, it will be readily understood that minor changes in the details of the invention may be made without departing from the spirit of the invention.

Having described the invention, we claim:

1. A packet-based communication system, comprising:
    a plurality of session initiation protocol (SIP) servers coupled to an originating communication device, wherein each SIP server transmits information packets from the originating device to a linked terminating communication device wherein at least two compression/decompression standards are supported on the end-to-end communication link between the originating device and the terminating device;
    each SIP server along the communication link generates and transmits a SIP message to initiate a communication session having a first data element associated with an additional cost factor and a second data element associated with an additional quality of service degradation for a compression/decompression standard supported by each SIP server; and;
    each SIP server operates an algorithm calculating the total cost and the total quality of service degradation associated with using a compression/decompression standard.

2. The packet-based communication system of claim 1 wherein at least one SIP server transcodes a first compression/decompression standard to a second compression/decompression standard and the second standard is selected based on total costs and total quality of service.

3. The packet-based communication system of claim 1 wherein the cost data element is associated with the bandwidth requirements for using the compression/decompression standard.

4. The packet-based communication system of claim 1 wherein the cost data element is associated with the Central Processing Unit requirement for transcoding imposed by using the compression/decompression standard.

5. The packet-based communication system of claim 1 wherein the quality of service data element is associated with the delay resulting from using the compression/decompression standard.

6. The packet-based communication system of claim 1 wherein the quality of service data element is associated with the sound accuracy loss associated with using the compression/decompression standard.

7. The packet-based communication system of claim 1 wherein a said compression/decompression standard is selected according to an algorithm for an optimal cost and optimal quality of service based on a calculated total cost and total quality of service.

8. The packet-based communication system of claim 1 wherein an algorithm calculates a cost value and a quality of service value based on the best transcoding option for an offered compression/decompression standard.

9. A method of selecting a compression/decompression standard on a communication network comprising the steps of:
    providing a plurality of computer servers coupled to provide a communication link from a first communication device to a second communication device, wherein for the end-to-end transmission of an information packet from the first communication device to the second communication device there is an additional cost or a degradation in quality of service associated with using at least one compression/decompression standard;

transmitting a first message from a first computer server to a sequential second computer server containing a data element for the costs and a data element for the quality of service degradation associated with using each supported compression/decompression standard on said first computer server; and selecting a compression/decompression standard for use based on the total costs and the total quality of service degradation for using said compression/decompression standard.

10. The method of selecting a compression/decompression standard on a communication network of claim 9 further comprising the step of performing at least one transcoding from a first compression/decompression standard to a second compression/decompression during a communication session by at least one computer server.

11. The method of selecting a compression/decompression standard on a communication network of claim 9 further comprising the step of:

calculating the total cost and total quality of service for using a selected compression/decompression standard between each linked pair of servers using an algorithm operating on each server.

12. The method of selecting a compression/decompression standard on a communication network of claim 9 further comprising the step of:

transmitting the cost and quality of service data elements in a session description protocol message.

13. The method of selecting a compression/decompression standard on a communication network of claim 9 wherein an algorithm selects the compression/decompression standard to use.

14. The method of selecting a compression/decompression standard on a communication network of claim 9 further comprising the step of:

transmitting a data element designating the selected compression/decompression message in a second message.

15. The method of selecting a compression/decompression standard on a communication network of claim 14 wherein the first message comprises a SIP Invite message.

16. The method of selecting a compression/decompression standard on a communication network of claim 15 wherein the second message comprises at least of the following SIP messages:

a 180 Ringing message;
a 200 OK message;
a 181 message;
a 182 message;
a 183 message;
a PRACK message;
an ACK message.

17. The method of selecting a compression/decompression standard on a communication network of claim 15 wherein the first message comprises at least of the following SIP messages:

a 180 Ringing message;
a 200 OK message;
a 181 message;
a 182 message;
a 183 message;
a PRACK message;
an ACK message.

18. A method for providing multimedia communication over a packet-based communication network comprising the steps of:

connecting a plurality of computer servers sequentially in a communication link between an originating communication device and a terminating communication device;

transmitting information packets from the originating device to the linked terminating communication device using a plurality of compression/decompression standards;

transcoding a first compression/decompression standard to a second compression/decompression standard wherein the second compression/decompression standard is selected based on a first data element designating an additional cost and a second data element designating an additional quality of service degradation associated with using said second compression/decompression standard; and transmitting a first message comprising a first data element designating a total cost and a second data element designating a total quality of service degradation associated with using each compression/decompression standard supported by a server.

19. The method for providing multimedia communication over a packet-based communication network of claim 18 further comprising the steps of:

operating an algorithm on a computer server to select said compression/decompression standard to use at an optimal cost and optimal quality of service based on a calculated total cost and total quality of service.

20. The method for providing multimedia communication over a packet-based communication network of claim 18 further comprising the steps of:

operating an algorithm on the terminating communicating device to select said compression/decompression standard to use at an optimal cost and optimal quality of service based on a calculated total cost and total quality of service.

* * * * *